Dec. 6, 1932.  C. P. DUBBS  1,890,316
APPARATUS FOR PRODUCING LOWER BOILING POINT HYDROCARBONS
Original Filed Nov. 4, 1918  4 Sheets-Sheet 2
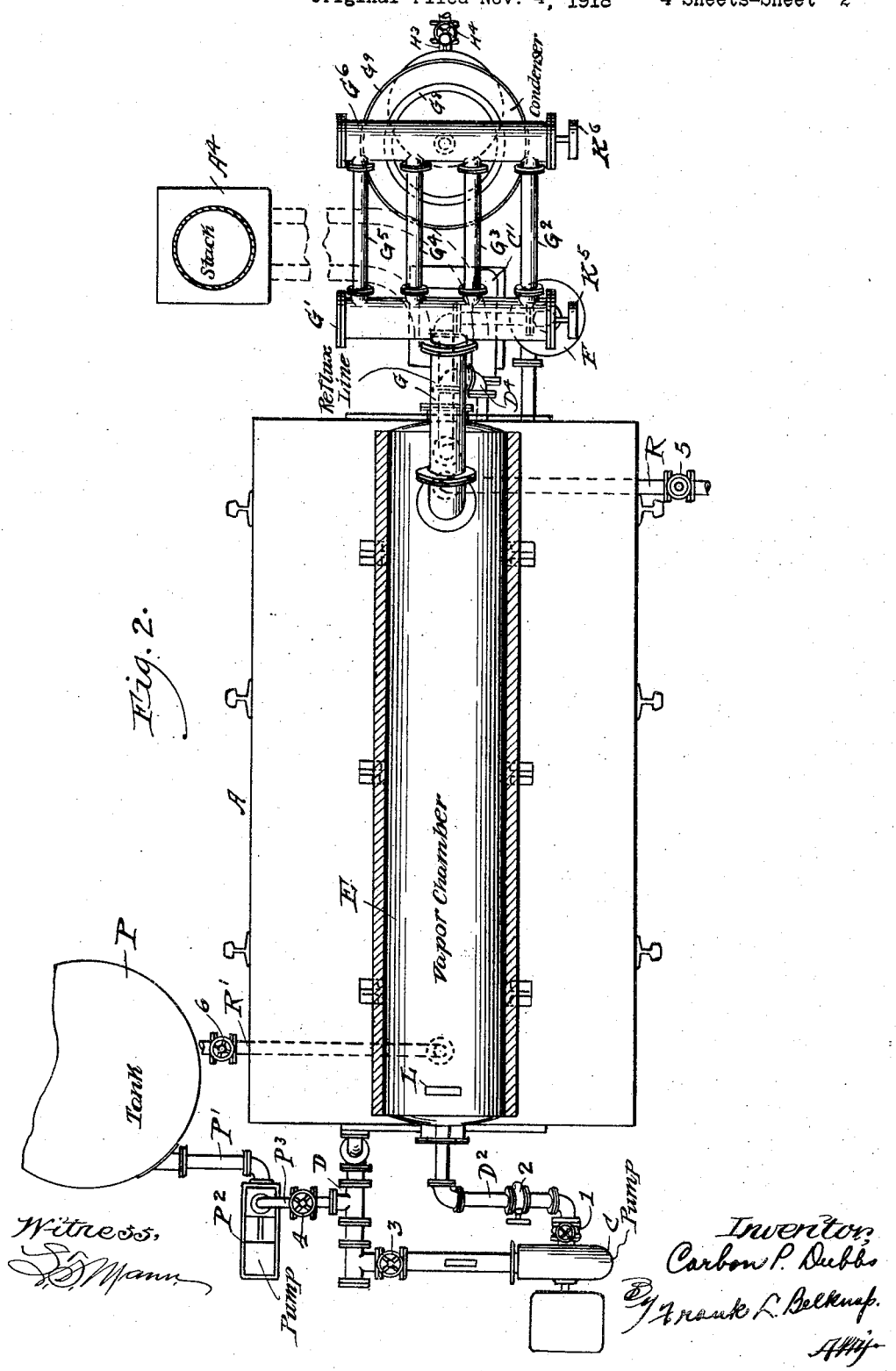

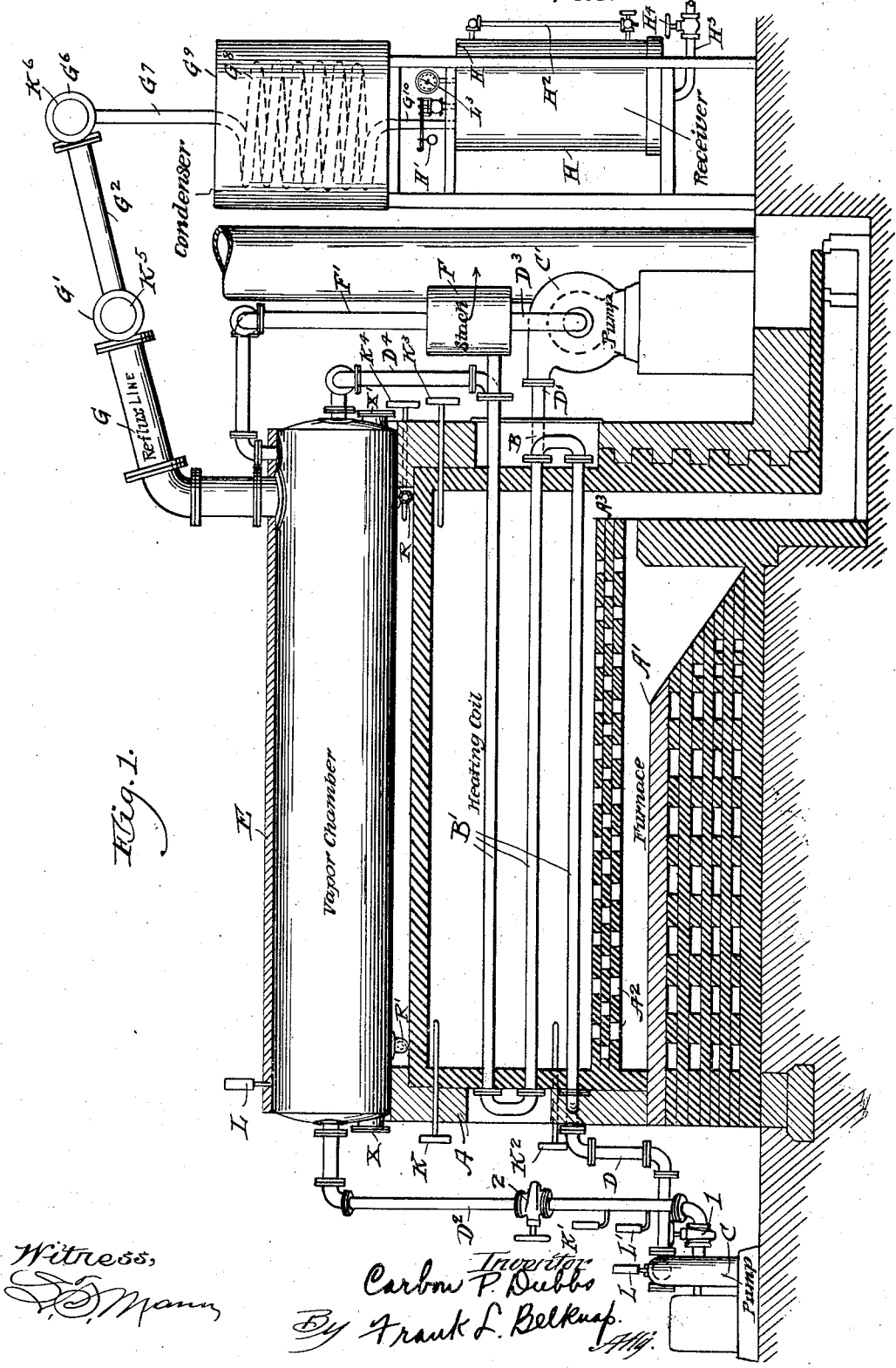

Dec. 6, 1932.                C. P. DUBBS                1,890,316
        APPARATUS FOR PRODUCING LOWER BOILING POINT HYDROCARBONS
                    Original Filed Nov. 4, 1918    4 Sheets-Sheet 3
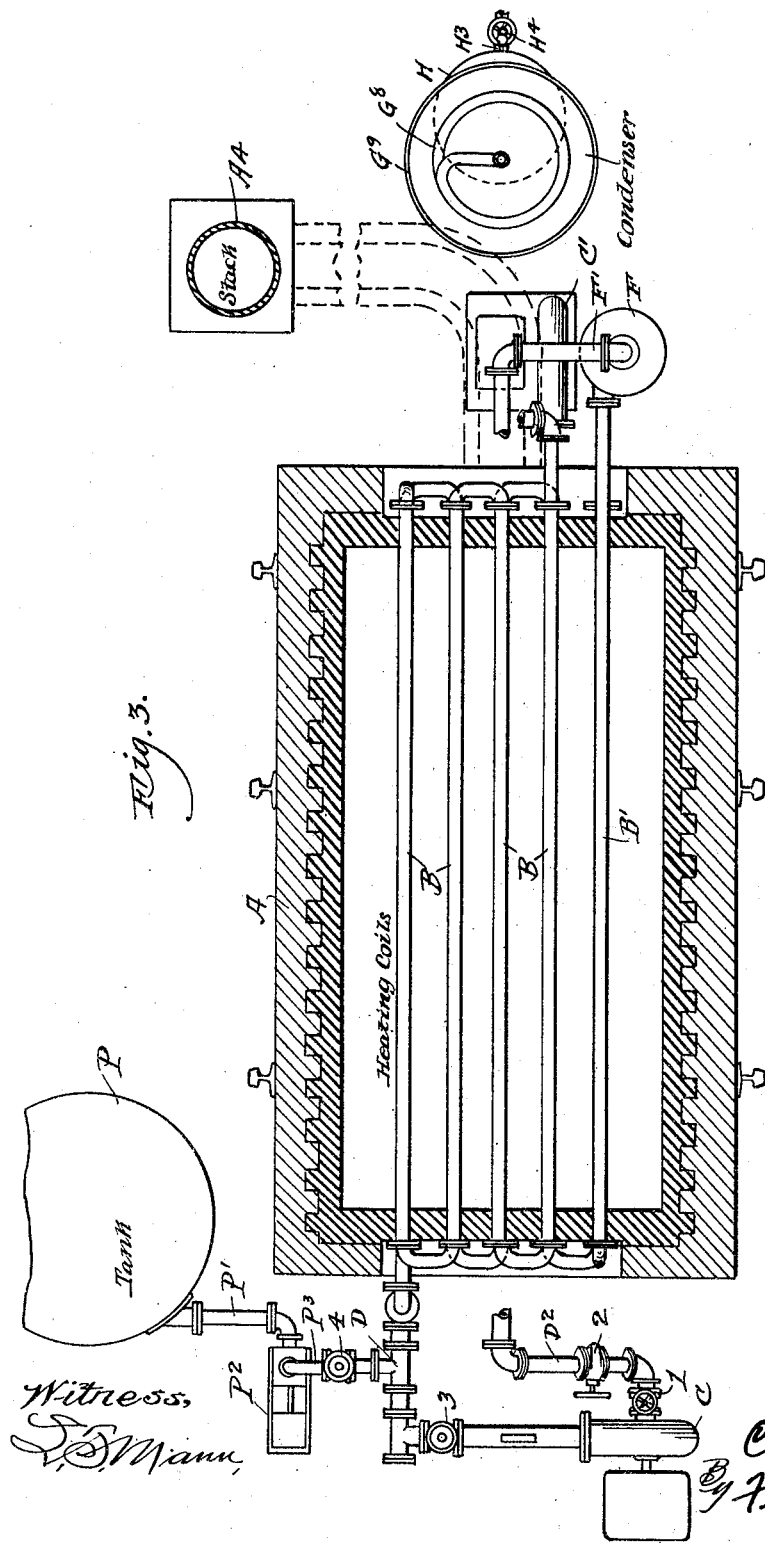

Dec. 6, 1932.   C. P. DUBBS   1,890,316
APPARATUS FOR PRODUCING LOWER BOILING POINT HYDROCARBONS
Original Filed Nov. 4, 1918   4 Sheets-Sheet 4
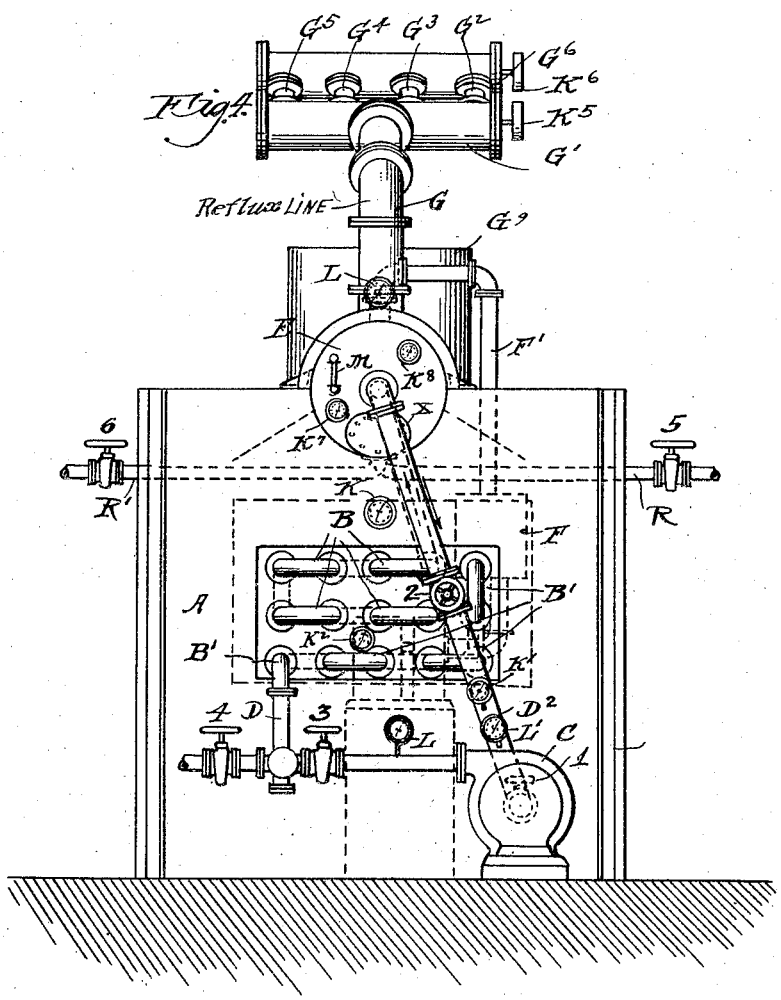

Patented Dec. 6, 1932

1,890,316

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

APPARATUS FOR PRODUCING LOWER BOILING POINT HYDROCARBONS

Continuation of application Serial No. 260,955, filed November 4, 1918. This application filed January 14, 1925. Serial No. 2,448. Renewed May 15, 1929.

This invention relates to an apparatus for treating hydrocarbon oils to produce therefrom products having lower boiling points. This application is a continuation of my copending application Serial No. 260,955 filed November 4, 1918.

The objects of this invention are, to provide an apparatus for separating oils of different boiling points; to provide an apparatus wherein the oil under treatment is circulated through a coil and then to and from a vapor chamber which latter chamber is only partly filled with the oil, the oil being heated as it passes through the former coil and as it passes through the latter chamber, and the oil being relieved of more or less of its vapor content, which vapors pass to and through a condenser while more or less of an insoluble material, such as carbon formed in the oil, settles and is drawn off while the remaining unvaporized oil passes from the vapor chamber back to and through the heating tubes, the whole being maintained under pressure; to provide an apparatus in which the heating of the oil under treatment is accomplished in the heating coils and said oil maintained in rapid circulation in these coils and then discharged into one end of the vapor chamber, said chamber being only partially filled with the oil, and said oil withdrawn from said chamber at the other end forced back through the heating coil, while more or less of the oil and carbon and other solids are drawn off as residuum, said vapor chamber being of such size in the cross section as to greatly reduce the speed of the flow of the oil from one end to the other and said chamber being of such dimensions as to permit more or less of its solid content to settle out and means being provided for the drawing off of more or less of the solids that are thus settled out of the oil along with part of the oil and means provided for supplying fresh oil to the apparatus; to provide an apparatus for continuous operation; to provide an apparatus in which those products that are only partly reduced or converted to the desired low boiling point, are returned and further circulated through the heating tubes; to provide an apparatus in which the vapors not having the desired low boiling points are condensed and automatically returned for further treatment; to provide a means whereby the free carbon produced can be settled out and removed without interrupting the operation of the process; to provide an apparatus for alternately heating the hydrocarbon, relieving same of its generated vapors and further heating the remaining liquid hydrocarbon; to provide in general an apparatus of the character referred to.

In the drawings:

Fig. 1 is a side elevation of the apparatus partly in section and partly broken away.

Fig. 2 is a plan view of the apparatus.

Fig. 3 is a plan view showing that section of the furnace containing the heating tubes.

Fig. 4 is one end view of the apparatus partly in section and partly broken away.

Referring to the drawings, A is the furnace proper with fire tunnel A—1, perforated arch wall A—2, flue tunnel A—3, stack A—4. Positioned in the furnace A are the heating coils B and B—1 connected with pumps C and C—1 by means of pipes D and D—1. D—2 is the pipe connecting vapor chamber E to pump C and D—3 is line connecting pump C—1 with separating receptacle F and said receptacle F is connected to vapor chamber E by means of line F—1. The coils B are connected to vapor chamber E by line D—4. G is the vapor line connecting with manifold G—1 which by means of pipes G—2, G—3, G—4 and G—5 is connected by manifold G—6 which latter manifold is connected by means of pipe G—7 to water cooled condenser coil G—8, positioned in tank G—9, and by means of pipe G—10 is connected with receiving tank H, which has positioned on it pressure regulating valve H—1, glass liquid gauge H—2, draw-off line H—3 with valve positioned on it marked H—4. The reference characters K—1, K—2, K—3, K—4, K—5 and K—6, designate pyrometers of standard make. L—1, L—2, and L—3 are pressure gauges and may be either indicating or recording. M is a glass liquid gauge on the end of the vapor chamber E. P is the supply tank for the raw material to be treated and is connected by means of line P—1 to pressure pump P—2 which discharges into line D through line P—3. R and R—1 are draw off lines from the vapor chamber E. 1, 2, 3, 4, 5 and 6 are valves, X and X—1 are cleaning plates.

Describing now the course of the oil and vapors, the material to be treated may be drawn from any suitable source of supply as for instance as shown in the drawing by tank P in which the raw material to be treated may be stored. This tank P is connected by means of pipe P—1′ pressure pump P—2 which discharges through line P—3 into line D into that section of the heating coils marked B—1 and then into chamber F. The vapors generated pass off through line F—1 into vapor chamber E while the unvaporized portion of the oil passes through line D—3 into pump C—1, through line D—1 into heating coils marked B (upper coils in Fig. 4) and from there pass through line D—4 into vapor chamber E. The vapors generated and accumulated in the vapor chamber E pass up through goose-neck G into manifold G—1 through pipes G—2, G—3, G—4 and G—5 into manifold G—6 and such vapors that are condensed therein are automatically drained back to vapor chamber E and subjected to further treatment, while the remaining vapors pass from manifold G—6 down through line G—7 through water cooled coil G—8, through line G—10 into receiver H and from which it can be drawn off continuously or intermittently through line H—3 through valve H—4. The excess incondensible gases are automatically relieved through pressure regulating valve H—1 or it may be relieved through an ordinary valve (not shown). The oil in the vapor chamber E, passes down through line D—2 into suction of pump C and is forced by this pump through line D through coils marked B—1 positioned in the furnace A and discharged into receptacle F as already described.

Pressure gauges and pyrometers are positioned in different places in the apparatus so that the proper temperatures and pressures may be maintained. Such pressures and temperatures will vary according to the oil being treated, the extent of the cracking taking place, etc. The oil in the vapor chamber E must be always maintained above the outlet to D—2 in order to insure a full supply being furnished the pump C. The supply of oil to chamber F should be sufficient to keep the pump C—1 supplied with oil.

Maintaining a high velocity on the oil while passing through the heating tubes will tend to keep the carbon and other solid matters in suspension and to a great extent prevent same from adhering to the walls of the tubes and when this oil is discharged into one end of the vapor chamber E, the vapor chamber E being of much larger capacity, the velocity of the oil as it flows from one end of the vapor chamber E to the other end of the vapor chamber, is greatly reduced and any excess carbon or other solid matters that are held in the solution or suspension by means of a higher agitation or velocity, will be precipitated out in the vapor chamber E and there held while the oil is drawn off from the vapor chamber E and again passes through the heating coils in the furnace A and subjected to further treatment. In order to have a large capacity vapor chamber and prevent substantial vaporization taking place in the heating tubes, I have provided a chamber F to be interposed between the heating coils and in which the oil is discharged and relieved of its vapors and then by means of another pump sent back through the furnace in other coils and then discharged into one end of the vapor chamber and as many of these chambers and pumps can be used as is found necessary to handle the desired capacity of the plant. The residuum and more or less of the carbon and other solid matters that settle therein are drawn off through lines R and R—1 either continuously or intermittently as likewise the raw material can be fed into the apparatus either continuously or intermittently.

It will be noted that the vapor chamber E is positioned outside of the furnace A and is heavily lagged as likewise should be all pipes outside of the furnace in order to prevent heavy loss of heat by radiation.

The entire system is subjected to a pressure either vapor or gas or otherwise created which pressure will range from 5 pounds to 500 pounds per square inch, the pressure used varying according to the conditions to be met, such as the particular oil under treatment and the products desired. The temperature to which the oil will be heated will presumably vary from 400° F. to 1200° F. though these limits not absolute in either case.

I claim as my invention:

1. An apparatus for treating hydrocarbon oils, comprising a plurality of heating coils of restricted cross-sectional area disposed within a furnace, means for passing the oil successively through each of the plurality of coils, means positioned intermediate said coils to relieve the oil of its vaporous constituents prior to its passage through the subsequent coil, means for passing the oil from the last of said coils to an enlarged vapor chamber wherein substantial conversion of the oil occurs, means for dephlegmating the evolved vapors, means for returning the reflux condensate to said enlarged vapor chamber, means for continuously returning the unvaporized reflux condensate and the lighter unvaporized residual oil in said vapor chamber to the inlet of the first of said coils, and means for maintaining a superatmospheric pressure on the oil undergoing conversion.

2. In an apparatus for continuously treating hydrocarbon oils, the combination of a heating zone, a vapor chamber, a reflux condenser, a final condenser and receiver serially connected, said heating zone comprising a plurality of elongated passageways, means interposed between said passageways for relieving the oil of its vaporous constituents prior to its passage through the subsequent passageway, and means for returning unvaporized reflux condensate and the lighter unvaporized residual oil from the vapor chamber under a mechanical pressure to the inlet of the first of said elongated passageways.

3. An apparatus for continuously treating hydrocarbon oils, consisting of a pair of coils of restricted cross-section disposed within a furnace, means interposed between said coils for relieving the oil passed through the first coil of its vaporous constituents prior to its passage through the second coil, and means for accelerating the velocity of the oil passed through the second coil, means for delivering the oil from the second coil to an enlarged vapor chamber wherein substantial conversion occurs, means for dephlegmating, condensing and collecting the evolved vapors, means for returning unvaporized reflux condensate and the lighter unvaporized residual oil from said vapor chamber under mechanical pressure to the inlet of the first of said coils, and means for continuously withdrawing heavy carbon-containing residual oil from said vapor chamber.

4. In an apparatus of the character described, the combination with a pair of heating coils seated in a furnace, of a separating receptacle interposed between the said coils and a vapor chamber mounted above the heating coils, a pump for forcing oil through the first heating coil, means for passing from said separating receptacle the vapors generated in the first heating coil to said vapor chamber, means for pumping the unvaporized oil through the second heating coil, means for passing the oil from the second heating coil to the vapor chamber, means for taking off and condensing vapors from the vapor chamber, and means for returning the oil from the vapor chamber to the first coil.

5. A hydrocarbon oil cracking apparatus which comprises a pair of heating coils disposed within a furnace and connected in series, means outside the furnace interposed between said coils for relieving the oil which has passed through the first coil of its vaporous components prior to its passage through the second coil, a pump interposed between said means and the second coil for accelerating the flow of liquid oil from said means through said second coil, a vapor separating chamber communicating with the outlet end of said second coil, a vapor conduit for passing vapors relieved from the oil in said means directly into said chamber, means for separately withdrawing vapors and unvaporized oil from said chamber, a partial condenser for the withdrawn vapors, and a final condenser communicating with said partial condenser.

CARBON P. DUBBS.